(12) United States Patent
Huang et al.

(10) Patent No.: US 9,849,655 B2
(45) Date of Patent: Dec. 26, 2017

(54) ADHESIVE FOR INSULATIVE ARTICLES

(71) Applicant: HENKEL IP & HOLDING GMBH, Duesseldorf (DE)

(72) Inventors: Tianjian Huang, Hillsborough, NJ (US); Kristina Thompson, Clinton, NJ (US); Daniel Waski, Elmhurst, IL (US); Kris Getty, Deerfield, IL (US)

(73) Assignee: HENKEL IP & HOLDING GMBH, Duesseldorf (DE)

( * ) Notice: Subject to any disclaimer, the term of this patent is extended or adjusted under 35 U.S.C. 154(b) by 0 days.

(21) Appl. No.: 15/158,879

(22) Filed: May 19, 2016

(65) Prior Publication Data

US 2016/0263876 A1 Sep. 15, 2016

Related U.S. Application Data

(63) Continuation of application No. PCT/US2014/067408, filed on Nov. 25, 2014.
(Continued)

(51) Int. Cl.
*B32B 29/00* (2006.01)
*D21H 19/12* (2006.01)
(Continued)

(52) U.S. Cl.
CPC ............. *B32B 29/002* (2013.01); *B32B 7/12* (2013.01); *B32B 21/04* (2013.01); *B32B 29/08* (2013.01); *C09J 109/06* (2013.01); *C09J 123/08* (2013.01); *C09J 125/14* (2013.01); *C09J 129/04* (2013.01); *C09J 131/04* (2013.01); *C09J 133/06* (2013.01);
(Continued)

(58) Field of Classification Search
CPC ...... D21H 19/12; D21H 21/54; B32B 29/002; B32B 7/12; B32B 21/04; B32B 29/08; B32B 2255/08; B32B 2255/12; B32B 2255/26; B32B 2307/54; B32B 2439/00; B32B 2307/51; B32B 2439/70; C08J 109/06; C08J 123/08; C08J 125/14;
(Continued)

(56) References Cited

U.S. PATENT DOCUMENTS 2,998,501 A 8/1961 Edberg et al.
3,253,064 A 5/1966 Buonaiuto
(Continued)

FOREIGN PATENT DOCUMENTS

CA 2078476 A1 3/1993
CA 2145938 A1 10/1995
(Continued)

OTHER PUBLICATIONS

Popil, Roman E. et al. "Adhesive level effect on corrugated board strength—experiment and FE modeling." In: International progress in paper physics seminar. Oxford, Ohio: Miami University, 2006.

*Primary Examiner* — Michael C Miggins
(74) *Attorney, Agent, or Firm* — Sun Hee Lehmann

(57) ABSTRACT

An adhesive composition that improves structural integrity and insulative properties when applied to a cellulosic substrate is provided. The adhesive composition includes a plurality of microspheres and an emulsion-based polymer that has (i) an elastic modulus greater than 0.5 MPa in the range temperature range of 70° C. to 110° C.; (ii) an absolute log(E)/T slope of less than 0.05 in the range temperature range of 70° C. to 110° C.; and (iii) a tan d value less than 0.6 at 90° C.

20 Claims, 2 Drawing Sheets

Related U.S. Application Data

(60) Provisional application No. 61/909,723, filed on Nov. 27, 2013.

(51) Int. Cl.

| | | |
|---|---|---|
| *D21H 21/54* | (2006.01) | |
| *B32B 7/12* | (2006.01) | |
| *B32B 21/04* | (2006.01) | |
| *B32B 29/08* | (2006.01) | |
| *C09J 109/06* | (2006.01) | |
| *C09J 123/08* | (2006.01) | |
| *C09J 125/14* | (2006.01) | |
| *C09J 129/04* | (2006.01) | |
| *C09J 133/06* | (2006.01) | |
| *C09J 133/08* | (2006.01) | |
| *C09J 175/04* | (2006.01) | |
| *C09J 131/04* | (2006.01) | |

(52) U.S. Cl.
CPC ......... *C09J 133/062* (2013.01); *C09J 133/08* (2013.01); *C09J 175/04* (2013.01); *D21H 19/12* (2013.01); *D21H 21/54* (2013.01); *B32B 2255/08* (2013.01); *B32B 2255/12* (2013.01); *B32B 2255/26* (2013.01); *B32B 2307/51* (2013.01); *B32B 2307/54* (2013.01); *B32B 2439/00* (2013.01); *B32B 2439/70* (2013.01)

(58) Field of Classification Search
CPC .... C08J 129/04; C08J 133/06; C08J 133/062; C08J 133/08; C08J 175/04; C08J 131/04
See application file for complete search history.

(56) References Cited

U.S. PATENT DOCUMENTS

| | | | |
|---|---|---|---|
| 3,563,851 A | 2/1971 | Armour et al. | |
| 4,005,033 A | 1/1977 | Georgeau | |
| 4,006,273 A | 2/1977 | Wolinski et al. | |
| 4,350,788 A | 9/1982 | Shimokawa et al. | |
| 5,264,467 A | 11/1993 | DiStefano | |
| 5,356,683 A | 10/1994 | Egolf et al. | |
| 5,928,741 A | 7/1999 | Andersen et al. | |
| 6,139,961 A | 10/2000 | Blankenship et al. | |
| 6,231,970 B1 | 5/2001 | Andersen et al. | |
| 6,255,369 B1 | 7/2001 | Philbin et al. | |
| 6,379,497 B1 | 4/2002 | Sandstrom et al. | |
| 6,648,955 B1 | 11/2003 | Swiezkowski et al. | |
| 6,740,373 B1 | 5/2004 | Swoboda et al. | |
| 6,749,705 B2 | 6/2004 | Skryniarz et al. | |
| 6,838,187 B2 | 1/2005 | Figiel et al. | |
| 7,335,279 B2 | 2/2008 | Monhan et al. | |
| 2002/0094403 A1 | 7/2002 | Ishikawa et al. | |
| 2004/0033343 A1 | 2/2004 | Comeau et al. | |
| 2007/0009723 A1 | 1/2007 | Ogawa et al. | |
| 2007/0155859 A1 | 7/2007 | Song et al. | |
| 2007/0224395 A1 | 9/2007 | Rowitsch et al. | |
| 2007/0228134 A1 | 10/2007 | Cook et al. | |
| 2007/0287776 A1 | 12/2007 | Nordin et al. | |
| 2008/0118693 A1 | 5/2008 | Bilski et al. | |
| 2009/0280322 A1 | 11/2009 | Daniels et al. | |
| 2009/0321508 A1 | 12/2009 | Fu et al. | |
| 2010/0012712 A1 | 1/2010 | Swoboda et al. | |
| 2010/0136269 A1 | 6/2010 | Andersen et al. | |
| 2010/0139878 A1 | 6/2010 | Nicolucci | |
| 2010/0181015 A1 | 7/2010 | Kohler | |
| 2011/0033398 A1 | 2/2011 | Cauvin et al. | |
| 2012/0015162 A1 | 1/2012 | Lion et al. | |
| 2012/0048450 A1 | 3/2012 | Fu et al. | |
| 2012/0100289 A1 | 4/2012 | Egan et al. | |
| 2013/0160945 A1 | 6/2013 | Huang et al. | |
| 2014/0131367 A1 | 5/2014 | Bordary et al. | |

FOREIGN PATENT DOCUMENTS

| | | |
|---|---|---|
| CN | 1643100 A | 7/2005 |
| CN | 101476265 A | 7/2009 |
| EP | 1216146 B1 | 10/2005 |
| EP | 1634897 A2 | 3/2006 |
| EP | 1674543 A1 | 6/2006 |
| EP | 1780250 A1 | 5/2007 |
| JP | S6144965 A | 3/1986 |
| JP | H05239423 A | 9/1993 |
| JP | 6313163 A | 11/1994 |
| JP | H08175576 A | 7/1996 |
| JP | 9-164621 A | 6/1997 |
| JP | 09217050 A | 8/1997 |
| JP | 2001207146 A | 7/2001 |
| JP | 2003-154589 A | 5/2003 |
| JP | 2005097816 A | 4/2005 |
| JP | 2010202996 A | 9/2010 |
| WO | 9014223 A1 | 11/1990 |
| WO | 0200800 A2 | 1/2002 |
| WO | 0231077 A2 | 4/2002 |
| WO | 2005110737 A1 | 11/2005 |
| WO | 2007142593 A1 | 12/2007 |
| WO | 2008084372 A1 | 7/2008 |

ADHESIVE FOR INSULATIVE ARTICLES

FIELD OF THE INVENTION

The present invention relates to an adhesive composition for insulative articles. In particular, the invention includes an adhesive composition and an article that comprises the adhesive for providing insulation and structural integrity.

BACKGROUND OF THE INVENTION

Traditional and widely used disposable food packages and containers are made from closed-cell extruded polystyrene foams. Because they are entirely made out of plastic, they do not biodegrade and thus, have a negative impact on the environment. Some regulations have banned the use of such packages and containers, for environmental reasons.

A more environmentally sound alternative food packages are made from a more renewable substrate, such as cellulosic sheet, e.g., paperboard, cardboard, paper, coated paper, films, bonded together with an adhesive. The alternative packages typically comprise at least two cellulosic substrates with an air gap interposed between the two substrates. As the package is handled and flexed, the air gap between the two substrates become compressed and the insulation is decreased in those compressed areas. To improve the insulative properties of the package, a divider (e.g., medium) can be placed in between the two substrates as a support structure or higher basis weight substrates or non-recycled paperboards may be used as the substrates. However, the aforementioned solutions increase cost and also increase carbon footprint.

The present invention seeks to improve insulating cellulosic sheet, through the use of an adhesive composition that adds insulative properties and structural integrity to the cellulosic sheet. The present invention provides an environmentally and economically sound package that provides thermal insulation and structural integrity.

SUMMARY OF THE INVENTION

The present invention relates to an adhesive composition that provides insulation and structural integrity when the adhesive is applied to a cellulosic substrate. The present invention further provides a multilayer-substrate article that comprises the adhesive interposed between the substrates. The adhesive provides insulative properties and structural integrity to the article.

In one embodiment, there is provided an adhesive composition comprising (a) a water-based polymer prepared by emulsion polymerization; (b) a plurality of expandable microspheres; and optionally (c) additive. The water-based polymer has (i) an elastic modulus greater than 0.5 MPa in the range temperature range of 70° C. to 110° C.; (ii) an absolute log(E)/T slope of less than 0.05 in the range temperature range of 70° C. to 110° C.; and (iii) a tan d value less than 0.6 at 90° C.

Another embodiment provides process for forming an article comprising the steps, (1) preparing a composition comprising a water-based polymer prepared by emulsion polymerization and a plurality of expandable microspheres; (2) applying the composition onto a substrate, which is a paper, paperboard, wood, foil, plastic or plastic film; (3) drying the composition to substantially remove the water; and (4) expanding the composition. The water-based polymer has (i) an elastic modulus greater than 0.5 MPa in the range temperature range of 70° C. to 110° C.; (ii) an absolute log(E)/T slope of less than 0.05 in the range temperature range of 70° C. to 110° C.; and (iii) a tan d value less than 0.6 at 90° C.

Yet another embodiment is directed to an article comprising a cellulosic substrate and a composition comprising a water-based polymer prepared by emulsion polymerization and a plurality of expandable microspheres. The polymer has (i) an elastic modulus greater than 0.5 MPa in the range temperature range of 70° C. to 110° C.; (ii) an absolute log(E)/T slope of less than 0.05 in the range temperature range of 70° C. to 110° C.; and (iii) a tan d value less than 0.6 at 90° C.

DETAILED DESCRIPTION OF THE INVENTION

Figure 1:
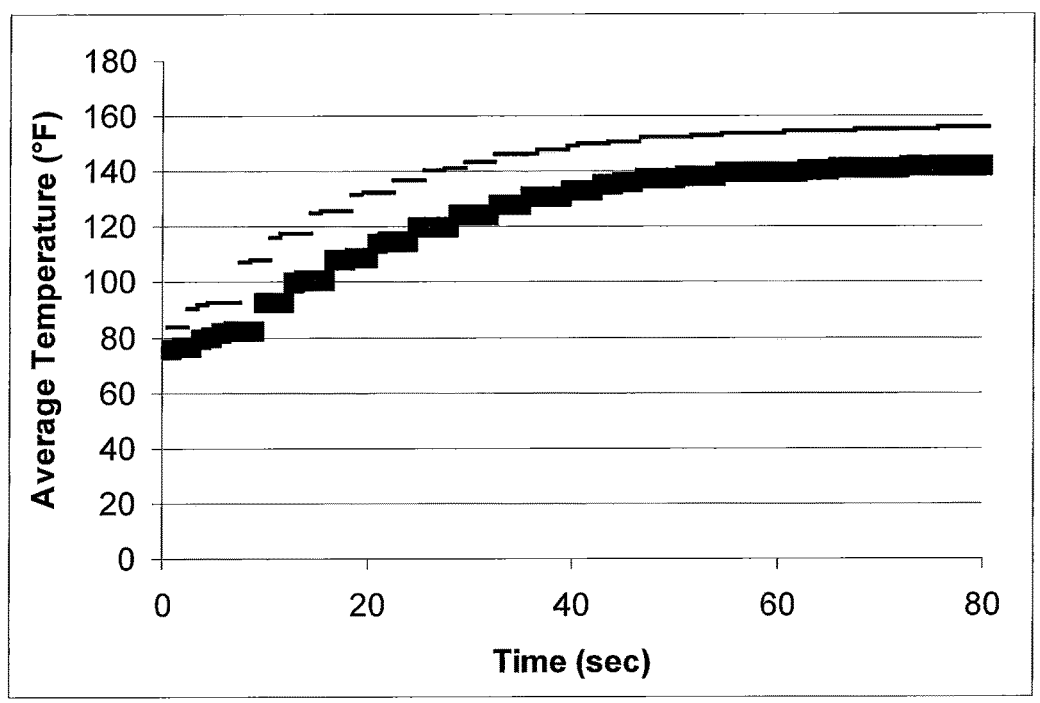
FIG. 1 is a plot of temperature verses time of two composites, one with the inventive adhesive (thicker line) and one without the inventive adhesive (thinner line).

The present invention provides an adhesive composition that provides insulation and structural integrity upon heating or applying radiation to the adhesive. The adhesive and the article made with the adhesive is more environmentally sound, e.g., biodegradable, than conventional closed-cell extruded polystyrene containers.

The present invention is based on the discovery that an adhesive composition comprising a water-based polymer prepared by emulsion polymerization and a plurality of expandable microspheres provide improved structural integrity and thermal insulation. The adhesive compositions described herein may be useful in multilayer substrates, particularly for cellulosic substrates. Through the use of the inventive adhesive composition, a greater insulation space may be provided between the two substrates, which it is attached at the point of adhesion. Such article containing multilayer substrates avoids the need for a divider, and thus, it is a more environmentally conscious product. The insulating products useful herein include paper products for consumer use, such as for hot drinking cups and lids, cold drinking cups and lids, hot food containers and lids, cold food containers and lids, freezer cartons and cases, and the like.

The adhesive composition may be made from any number of materials. Desirably, the adhesive composition includes an emulsion polymer component, a plurality of microspheres, and optionally, plasticizer and water. The adhesive composition may further include one or more preservatives, tackifiers or fillers. Other materials that do not adversely affect the adhesive and insulating properties of the adhesive composition may be used as desired.

The adhesive composition includes a water-based polymer prepared by emulsion polymerization. The emulsion polymer may be present in the adhesive composition in any amount, and desirably is present in an amount of from about 50% to about 99.5 wt %, preferably from about 50% to about 70 wt %, by weight of the adhesive composition prior to setting of the composition. Depending on the emulsion polymer, the solid levels vary from about 40 wt % to about 60 wt %, based on the emulsion polymer.

The water-based polymer may be selected so that it can be highly plasticized by water. This allows efficient expansion for the microspheres during heating. Preferably, the emulsion polymer is stabilized by hydrophilic protective colloids. The water-based polymer prepared by emulsion polymerization may be a single grade or a mixture of synthetic emulsion polymer or polymers of a natural origin. The water-based polymer prepared by emulsion polymerization may include any desired polymer components, including vinyl acetate ethylene dispersion, polyvinyl acetate, polyvinyl acetate polyvinyl alcohol, dextrin stabilized polyvinyl acetate, polyvinyl acetate copolymers, vinyl acetate ethylene copolymers, vinylacrylic, styrene acrylic, acrylic, styrene butyl rubber, polyurethane and mixtures thereof. Particularly preferred emulsion polymer components are vinyl acetate ethylene dispersion and polyvinyl acetate.

In one embodiment, the water-based polymer has an elastic modulus greater than 0.5 MPa in the range temperature range of 70° C. to 110° C. All reported modulus measurements, unless otherwise stated, were conducted in accordance with ASTM D5026. In another embodiment, the water-based polymer has an elastic modulus greater than 5 MPa in the range temperature range of 85° C. to 100°. Yet in another embodiment, the water-based polymer has an absolute $\log(E)/T$ slope of less than 0.05 in the range temperature range of 70° C. to 110° C. In another embodiment, the water-based polymer has an absolute $\log(E)/T$ slope of less than 0.008 in the range temperature range of 85° C. to 100° C. Still in another embodiment, the water-based polymer has a tan d value less than 0.6 at 90° C.

The adhesive composition further includes a plurality of pre-expanded or expandable microspheres. The pre-expanded microspheres are fully expanded and do not need to undergo further expansion. The expandable microspheres useful in the present invention should be capable of expanding in size in the presence of heat and/or radiation energy (including, for example, microwave, infrared, radiofrequency, and/or ultrasonic energy). The microspheres useful in the present invention include, for example, heat expandable polymeric microspheres, including those having, a hydrocarbon core and a polyacrylonitrile shell (such as those sold under the trade name DUALITE®) and other similar microspheres (such as those sold under the trade name EXPANCEL®). The expandable microspheres may have any unexpanded size, including from about 12 microns to about 30 microns in diameter. In the presence of heat, the expandable microspheres of the present invention may be capable of increasing in diameter by about 3 times to about 10 times. Upon expansion of the microspheres in the adhesive composition, the adhesive composition becomes a foam-like material, which has improved insulation properties. It may be desired, as will be explained below, that the expansion of the microspheres takes place in a partially set adhesive composition.

The expandable microspheres have a particular temperature at which they begin to expand and a second temperature at which they have reached maximum expansion. Different grades of microspheres have different expansion temperature (Texp) and maximum expansion temperature (Tmax). For example, one particularly useful microsphere has a Texp of about 80° C. to about 100° C. While any particular grade of microspheres may be used in the present invention, the Texp and Tmax of the microspheres should be taken into account when formulating and processing. The temperature at which the microspheres have reached maximum expansion (Tmax) is desirably from about 120° C. to about 130° C.

Although the choice of the particular microspheres and their respective Texp and Tmax is not critical to the invention, the processing temperatures may be modified depending upon these temperatures. Before the adhesive composition is fully dried, these microspheres are able to move within the composition and are able to expand. Once the adhesive composition is fully dry, however, the microspheres are substantially locked in place, making expansion thereof difficult, if not impossible.

In preferred embodiments, it is desirable that the expandable microspheres be present in the adhesive composition in an amount of from about 0.1% to about 10% by weight of the adhesive composition prior to setting of the composition, and more desirably from about 0.5% to about 7% by weight of the adhesive composition prior to setting of the composition, and most desirably at about 1% to about 5% by weight of the adhesive composition prior to setting of the composition. The expansion ratio of the expandable microspheres and the loading level of the microspheres will be related to each other.

Depending on the fully expanded size of the microspheres, the amount of the expandable microspheres in the adhesive can be adjusted. Depending upon the particular expandable microspheres used in the composition, the desired amount of the microspheres in the composition may be modified. Typically, if the adhesive composition includes too high a concentration of expandable microspheres, there will be insufficient adhesion and strength upon expansion of the microspheres, and thereby weakening the structural integrity of the composite.

Figure 2:
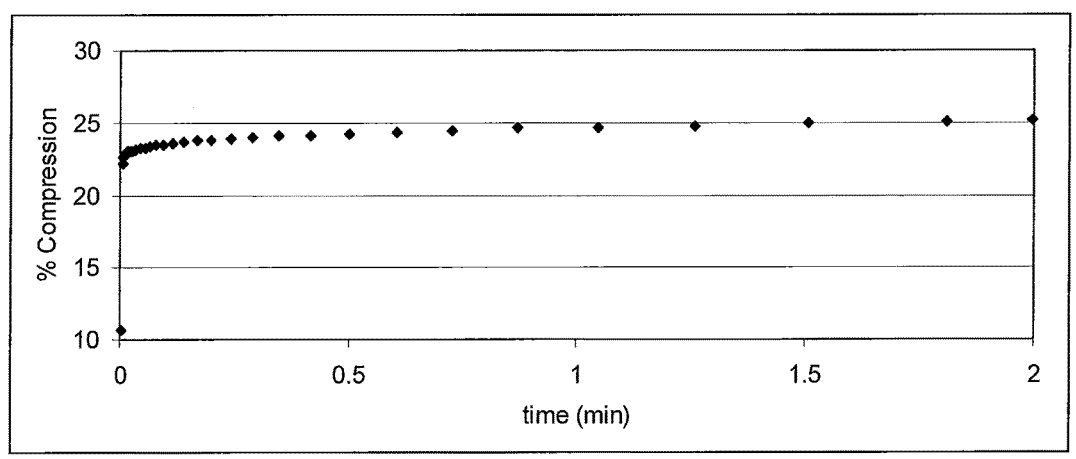
FIG. 2 is a plot of percent compression verses time of as the composite is compressed at 191° F. with a force of 2 psi for 2 minutes.

It has been discovered that the addition of 0.1% to about 10% of expandable microspheres by weight of the adhesive composition prior to setting allows for improved structural integrity. The expanded adhesive has a greater than 150%, preferably greater than 200%, total volume expansion from a wet or partially-dry adhesive coating. As shown in FIG. 2, the adhesive provides about 75% height separation of the composite (paper substrates held together with the adhesive) even when compressed at 191° F. with a force of 2 psi for 2 minutes. Thus, the adhesive provides structural integrity to the multilayer substrates even after exposure to hot compression.

The adhesive composition optionally includes a plasticizer. Exemplary plasticizers are dibenzoates available as BENZOFLEX®, such as diethylene glycol dibenzoate, dipropylene glycol dibenzoate, and the like.

The adhesive composition may optionally include any polar solvent, particularly water, in the formulation.

The adhesive composition optionally further includes any tackifiers, humectants, crosslinkers, preservatives, e.g., antioxidant, biocide; filler, pigment, dye, stabilizer, rheology modifier, polyvinyl alcohol, and mixtures thereof. These components can be included in an amount of from about 0.05% to about 15% by weight of the adhesive composition prior to setting of the composition. Exemplary preservatives include 1,2-benzisothiazolin-3-one, 5-chloro-2-methyl-4-isothiazolin-3-one and 2-Methyl-4-isothiazolin-3-one. Typically, preservatives may be used in the amount of from about 0.05% to about 0.5% by weight of the adhesive composition prior to setting of the composition.

The addition of a crosslinker will further increase the structural integrity of the adhesive after the microspheres are expanded.

The adhesive composition may further include an accelerator. The accelerator is a multivalent cation from water-soluble salts, including commonly available aluminum nitrate ($Al(NO_3)_3$), zirconium acetate, ammonium zirconyl carbonate (available as Bacote 20 from Zirconium Chemicals). The addition of a multivalent water-soluble salt shortens the time required for radiation during the expansion of the adhesive composition. When added, from about 0.05 to about 1, preferably from about 0.1 to 0.3 wt % based on the total weight of the adhesive composition, may be used.

Although the adhesive can start to coalesce at room temperature, the adhesive composition may still have high moisture content and will be substantially fluid. For adhesives with expandable microspheres, a form of energy may be introduced to the adhesive to expand the microspheres before fully drying the adhesive. The form of energy is typically heat from conduction, induction or radiation. For adhesives containing pre-expanded microspheres, no additional form of energy is necessary.

For both expandable and pre-expanded microsphere containing adhesives, heaters and fans may be used to drive off the excess water to aid in drying the adhesives. In a particularly desirable embodiment of manufacturing products, the adhesive composition may be applied to the surface (or surfaces) of a substrate and subjected to heat sufficient to coalesce the adhesive. At the onset of adhesive coalescence and while the adhesive is still substantially fluid-like, the adhesive may aid in holding the adhesive and microspheres in place, but will allow the microspheres the freedom to expand. In one embodiment, the heat may then be raised to a temperature sufficient to expand the microspheres. It is preferable for the heater to be set to a temperature range between the Texp and Tmax of the microspheres. Finally, the heat may be raised again to a temperature sufficient to fully drive the water off the adhesive composition. Heat may be applied by any desired method, including in an oven or through the use of heated rollers. It should be noted that the various stages (onset of setting, expansion of the microspheres, and fully drying the adhesive) may be achieved by radiation energy, either as a replacement for, or in addition to, direct heat. That is, for example, the various steps may be achieved by use of microwave or radiofrequency radiation. Besides conduction, induction heating method may be used in the process. In addition, the process may include any combination of heat application and radiation application. For example, the initial coalescence of the adhesive may be achieved through direct heat, while the expansion of the microspheres may be achieved through application of radiation energy.

Other additives may be included in the composition to increase the coalescence of the adhesive, is desired.

The inventive adhesive is particularly suitable for insulative packages that are typically directed for use at elevated and/or reduced temperatures and requires thermal insulation.

Another embodiment provides a method of preparing an article having improved structural integrity and insulative properties, including the steps of: (a) providing a first substrate having a first side and second side; (b) providing a second substrate having a first side and second side; (c) preparing an adhesive composition by combining (i) an emulsion-based polymer selected from the group consisting of vinyl acetate ethylene dispersion, polyvinyl acetate, polyvinyl acetate polyvinyl alcohol, dextrin stabilized polyvinyl acetate, polyvinyl acetate copolymers, vinyl acetate-ethylene copolymers, vinylacrylic, styrene acrylic, acrylic, styrene butyl rubber, polyurethane and mixtures thereof; (ii) a plurality of expandable microspheres, and optionally (iii) a plasticizer and (iv) water to form an adhesive; (d) applying the adhesive either (i) to a surface of the first side of the first substrate, (ii) to a surface of the second side of the second substrate or (iii) to both a surface of the first side of the first substrate and a surface of the second side of the second substrate; (e) contacting the first substrate and the second substrate together where the applied adhesive is interposed between the two substrates to form a composite structure; and (f) applying heat and/or radiation to expand the expandable microspheres to form a bond adhering the first and the second substrates together. The resultant multilayer substrate with an adhesive containing the microspheres has an improved structural integrity and thermal insulation.

The adhesives may be formed immediately prior to applying onto a substrate or pre-made in advance and stored until needed.

Another embodiment is directed to insulated packages and a method for forming insulated packages. The packages include cups, food containers, cases, cartons, bags, lids, boxes, envelopes, wraps, clamshells, and the like. It is preferred that the substrates of the packages have a reduced basis weight, caliper, and fiber content as compared to traditional substrates used for the same packages.

The substrates include fibreboards, chipboards, corrugated boards, corrugated mediums, solid bleached boards (SBB), solid bleached sulphite boards (SBS), solid unbleached board (SLB), white lined chipboards (WLC), kraft papers, kraft boards, coated papers, binder boards, and reduced basis weight substrates.

In one embodiment, there is provided an insulating sheet including a substantially flat paper having a first side and a second side. The first side of the paper includes a plurality of expandable microspheres secured thereto in an adhesive composition, where the plurality of expandable microspheres has been expanded and the adhesive composition has been dried. Thus, the product includes a paper having an adhered, foam-like composition on the first side thereof. The expandable microspheres include those described above, and the adhesive composition includes the components described above, including the emulsion polymer, and optional polar solvent, plasticizer, humectants, preservatives, or fillers.

The adhesive composition may be applied to the first surface of the paper in any configuration desired, including in a series of dots, stripes, waves, checkerboard patterns, any general polyhedron shapes that have substantially flat bases, and combinations thereof. Application of these patterns decreases the amount of adhesive in the packages. Further, the adhesive composition may be applied to the first surface in a series of cylinders. In addition, if desired, the adhesive composition may be applied to the first surface as a substantially flat sheet of adhesive covering the entire first surface (full lamination) or covering a portion of the first surface. The adhesive composition may be applied in the presence of heat if desired; however, it is important that the heat at application not be so high as to fully set the adhesive composition before expanding the expandable microspheres. A skilled artisan can determine this amount of pressure without undue experimentation. Optionally, a second paper may be applied to the top surface of the adhesive composition, forming a sandwiched configuration of: first paper-adhesive with expanded microspheres-second paper.

After the adhesive composition has been applied to the first side of the paper or, in one alternative, the paper with wet adhesive thereon may be exposed to heat and/or radiation energy to coalesce the adhesive composition. The adhesive composition therefore locks in the components, including the plurality of microspheres, in place and adheres them to the surface of the paper. It may be desired to only partially dry the adhesive composition, to the point that the composition locks in the components and maintains them sticking to the surface of the paper, but is not completely dry. A skilled artisan can determine state without undue experimentation. As explained above, only partially drying the adhesive composition (i.e., leaving a higher amount of moisture in the adhesive, such as at least 10% moisture content) allows the expandable microspheres to expand.

After the adhesive begins to coalesce, the paper is then exposed to heat and/or radiation energy sufficient to expand the plurality of microspheres. In one embodiment, the paper with wet adhesive thereon is exposed to heat at a temperature sufficient to expand at least a majority of the microspheres, in between the ranges of Texp and Tmax. In another embodiment, the paper with wet adhesive thereon is exposed to microwave or infrared energy sufficient to expand at least a majority of the expandable microspheres. The resulting product is a paper having an adhesive having expanded microspheres therein. The adhesive composition may then be exposed to heat and/or radiation energy sufficient to fully set the adhesive composition.

If desired, after application of the adhesive composition to the first side of the paper, a second paper having a first side and second side may be provided and the first side of the second paper applied to the surface of the applied adhesive composition, forming a sandwich configuration. Thereafter, expansion of the microspheres and setting of the adhesive may take place as explained above.

Multilayer substrate packages formed with the inventive adhesives containing microspheres improve the ability of the package to withstand strain under a constant stress at elevated and/or reduced temperatures. It is expected to those skilled in the art that the strain of the adhesive increases with the addition of microspheres at elevated temperature. The inventive adhesive is particularly suitable for consumer packages that are typically directed for use at elevated temperatures. The inventive adhesive provides structural support in between the paper boards of the package, and this maintains the structural integrity of the package, and thereby insulation is improved for the package.

In one embodiment, there is provided a multilayer substrate that contains two substrates and the adhesive, without any further substrates, e.g., a divider. Heretofore, it has been difficult to achieve a product that has the necessary thermal insulation and structural integrity without including a divider layer. The adhesive may be applied to completely coat the two substrates or in a selected or a random pattern. The insulated article with patterned adhesive allows for gaps within the two substrates.

Yet in another embodiment, the insulated article comprises a substantially flat substrate and a non-flat, rounded substrate. The adhesive is applied either to the substantially flat substrate, the non-flat substrate, or to both substrates, to form the insulated article. The adhesive may be applied to completely coat the surface of the substrate(s) or to selectively coat portions of the surface of the substrate(s). The pattern can be random or various ordered designs. The resulting article thus has an insulating space between the liner surfaces. The articles with patterned adhesives mimic a divider interposed between the two substrates. The space between the two substrates are generated and maintained by the adhesive.

Another exemplary consumer package is a corrugated box package formed with lower basis weight substrates and a lower basis weight divider. The substrates and divider are made of paper that has a reduced basis weight when compared to traditional insulating corrugated boards.

The present invention may be better understood through analysis of the following examples, which are non-limiting and are intended only to help explain the invention.

EXAMPLES

Example 1—Elastic Modulus, Absolute (log(E/T) Slope and Tan Delta of Water-Based Resin Emulsions All reported measurements were conducted in accordance with ASTM D5026.

| Temperature (° C.) | Water-based resin emulsion 1 | | Water-based resin emulsion 2 | | Water-based resin emulsion 3 | | Comparison water-based resin emulsion | |
|---|---|---|---|---|---|---|---|---|
| | E' (MPa) | tan d | E' (MPa) | tan d | E' (MPa) | tan d | E' (MPa) | tan d |
| 70 | 6.98 | 0.6255 | 29.63 | 0.5135 | 480.83 | 0.1470 | 0.74 | 0.5821 |
| 75 | 5.04 | 0.5798 | 21.08 | 0.4559 | 438.34 | 0.1221 | 0.62 | 0.5930 |
| 80 | 3.22 | 0.5651 | 13.73 | 0.4541 | 393.43 | 0.1086 | 0.51 | 0.5988 |
| 85 | 2.06 | 0.5379 | 8.54 | 0.4891 | 364.10 | 0.1109 | 0.45 | 0.6050 |
| 90 | 1.46 | 0.4909 | 4.97 | 0.5407 | 334.71 | 0.1192 | 0.38 | 0.6140 |
| 95 | 1.13 | 0.4439 | 2.83 | 0.5785 | 305.21 | 0.1313 | 0.32 | 0.6319 |
| 100 | 0.92 | 0.4063 | 1.68 | 0.5784 | 256.50 | 0.1936 | 0.25 | 0.6599 |
| 105 | 0.77 | 0.3797 | 1.09 | 0.5514 | | | 0.18 | 0.6947 |
| 110 | 0.64 | 0.3593 | 0.75 | 0.5200 | | | 0.11 | 0.7232 |
| absolute (log(E)/T) slope in 70-100° C. | 0.0270 | | 0.0429 | | 0.0080 | | 0.0177 | |

Example 2—Formation of an Adhesive

Adhesive compositions were prepared having the following composition.

TABLE 1

| Component | | Component | A (wt %) | B (wt %) | Comparison (wt %) |
|---|---|---|---|---|---|
| Water-based resin emulsion 1 | (i) | an elastic modulus greater than 0.5 MPa in the range temperature range of 70° C. to 110° C.; | 90.7 | 88.00 | |

TABLE 1-continued

| Component | | Component | A (wt %) | B (wt %) | Comparison (wt %) |
|---|---|---|---|---|---|
| | (ii) | an absolute log(E)/T slope of less than 0.05 in the range temperature range of 70° C. to 110° C.; and | | | |
| | (iii) | a tan d value less than 0.6 at 90° C. | | | |
| Comparison Water-based resin emulsion | (i) | an elastic modulus greater than 0.5 MPa in the range temperature range of 70° C. to 85° C. and lower than 0.5 MPa in the range temperature range of 85° C. to 110° C.; | | | 90.7 |
| | (ii) | an absolute log(E)/T slope as 0.0177 in the range temperature range of 70° C. to 110° C.; and | | | |
| | (iii) | a tan d value as 0.6140 | | | |
| Expandable microspheres | | DUALITE ® U020-125W | 4.0 | 3.50 | 4.0 |
| Plasticizer | | glycerin | 3.0 | 2.00 | 3.0 |
| Additive | | surfactant, defoamer, preservative | 0.3 | 0.25 | 0.3 |
| Additive | | accelerator - Aluminum nitrate | 0 | 0.75 | 0 |
| water | | | 2.0 | 5.50 | 2.0 |

The above components were mixed in a vessel and then Sample A was applied in between two paper substrates as thin, bead stripes of 0.1 gift to form a composite cup. The bead stripes were expanded by microwave heating. A comparative composite was made in the same manner, maintaining the same fly separation, but without any adhesive stripes as support.

Example 2—Insulative Properties

The composite cup was tested for the insulative properties with Adhesive Sample A. On an open ring, two thermocouples (Digi-Sense, Type J) were placed at opposite sides, and the cup was configured in the ring so that only the two thermocouples rested on the surface of the cup. Two compressible foams were also placed on the other side of the thermocouple to mimic pressure on the point of contact. Water, at 190.25° F., was poured into the composite cup and the thermocouple temperatures were recorded. An average of the thermocouple readings, at 5 second intervals are shown Table 2, and the entire temperature plot against time is shown in FIG. 1.

TABLE 2

| time (second) | Comparative Composite (° F.) Thin line | Composite (° F.) Thicker line |
|---|---|---|
| 5 | 91.85 | 79.95 |
| 10 | 107.45 | 91.85 |
| 15 | 124.35 | 100.55 |
| 20 | 132.05 | 108.10 |
| 25 | 136.40 | 119.15 |
| 30 | 142.90 | 124.20 |
| 35 | 146.25 | 127.70 |
| 40 | 149.35 | 132.80 |
| 45 | 150.60 | 135.50 |
| 50 | 151.95 | 137.10 |
| 55 | 153.35 | 139.15 |
| 60 | 153.60 | 139.70 |
| 65 | 154.50 | 140.40 |
| 70 | 154.90 | 141.25 |
| 75 | 155.10 | 141.35 |
| 80 | 155.40 | 141.65 |

As shown in Table 2 and FIG. 1, the composite cup had lower temperatures than the comparative composite temperatures, indicating that heat was better insulated in the composite cup. At around 50 seconds and thereafter, the measured composite temperature stabilized 14-15° F. lower than the temperature of the comparative composite.

Example 3—Structural Integrity

The expanded adhesive provided structural integrity in the composite during a hot compression test. Three beads (size 2.4 mm diameter) of Sample A were applied in between two substrates, and then expanded by microwave heating. In accordance with ASTM method D5024, the composite was then compressed at 191° F. with a force of 2 psi for 2 minutes. The results of the percent compression are shown in Table 3 and FIG. 2.

TABLE 3

| time (min) | % Compression |
|---|---|
| 0.00 | 0.10 |
| 0.10 | 23.50 |
| 0.20 | 23.80 |
| 0.29 | 24.00 |
| 0.42 | 24.10 |
| 0.50 | 24.20 |
| 0.61 | 24.30 |
| 0.73 | 24.40 |
| 0.87 | 24.60 |
| 1.05 | 24.70 |
| 1.26 | 24.80 |
| 1.51 | 25.00 |
| 1.81 | 25.10 |
| 2.00 | 25.20 |

The composite with the adhesive is able to maintain greater than 70%, and even greater than 75% of the original height (separation) during the hot compression test. Furthermore, the adhesive can provides this structural integrity to the composite throughout the entire two minutes.

Example 4—Hot Creep Test

Hot creep test was conducted on a composite made with Sample A adhesive and two substrates. On a solid bleached sulfite board, five ½" array dots of Sample A were placed, and then covered with a second solid bleached sulfite board. This composite was then placed in a TA Instruments DMA Q-800, heated on a hot plate setting at 191° F. (88.3° C.), and then tested in accordance with ASTM D 5024 (0.25 inch$^2$). Once the force of 300 g was reached, the strain percent was measured (as time 0). The same hot creep test was conducted with a composite made with Comparison adhesive and the same substrates, and the strain percents are listed in Table 4.

TABLE 4

| time (sec) | Strain % A | Strain % Comparison |
| --- | --- | --- |
| 0 | 0.1 | 0.0 |
| 5 | 23.5 | 24.5 |
| 10 | 23.8 | 25.0 |
| 14 | 23.9 | 25.3 |
| 21 | 24.1 | 25.6 |
| 25 | 24.1 | 25.7 |
| 30 | 24.2 | 25.9 |
| 36 | 24.3 | 26.1 |
| 44 | 24.4 | 26.3 |
| 52 | 24.6 | 26.5 |
| 63 | 24.7 | 26.8 |
| 75 | 24.8 | 27.0 |
| 91 | 25.0 | 27.3 |
| 109 | 25.1 | 27.6 |
| 120 | 25.2 | 27.7 |

As shown in Table 4, composite made with Adhesive A had overall lower strain percent during the hot creep test than composite made with Comparison adhesive. The Adhesive A maintained overall lower strain percent and was also able to maintain 75% of the original structural height even at 120 seconds.

Example 5—Effect of Accelerator

Sample adhesives A (without accelerator) and B (with accelerator) were expanded in a microwave. For the microwave expansion, wet dots of samples were placed on a substrate and then expanded in the microwave for the same amount of time. The expansion ratios of dry to wet and dry to dry of the samples are listed in Table 5.

TABLE 5

| | Wet Dot (mg) | Expansion Ratio (dry/wet) | Expansion Ratio (dry/dry) |
| --- | --- | --- | --- |
| Sample A | 4.1 | 6.5 | 11.6 |
| Sample B | 4.1 | 9.8 | 17.5 |
| Sample A | 3.4 | 7.7 | 13.8 |
| Sample B | 3.4 | 9.4 | 16.8 |

As shown in Table 5, Sample B (with accelerator) had higher volumetric expansion ratios than Sample A for both dry/wet and dry/dry. It was observed that Sample B expanded earlier than Sample A in the microwave. It was also observed that Sample B required less time than Sample A to reach the same volumetric expansion in the microwave.

The invention claimed is:

1. A waterborne-based adhesive comprising:
   (a) a water-based polymer prepared by emulsion polymerization;
   (b) a plurality of expandable microspheres; and
   (c) optionally, an additive;
   wherein the water-based polymer has (i) an elastic modulus greater than 0.5 MPa in the range temperature range of 70° C. to 110° C.; (ii) an absolute log(E)/T slope of less than 0.05 in the range temperature range of 70° C. to 110° C.; and (iii) a tan d value less than 0.6 at 90° C.

2. The waterborne-based adhesive of claim 1, wherein the water-based polymer has (i) modulus of 5 MPa at 85° C. to 100° C.

3. The waterborne-based adhesive of claim 1, wherein the water-based polymer is selected from the group consisting of emulsion-based polymer selected from the group consisting of vinyl acetate ethylene dispersion, polyvinyl acetate, polyvinyl acetate polyvinyl alcohol, dextrin stabilized polyvinyl acetate, polyvinyl acetate copolymers, vinyl acetate-ethylene copolymers, vinylacrylic, styrene acrylic, acrylic, styrene butyl rubber, polyurethane and mixtures thereof.

4. The waterborne-based adhesive of claim 1, wherein the expandable microspheres have a hydrocarbon core and a polyacrylonitrile shell.

5. The waterborne-based adhesive of claim 1, wherein the expandable microspheres begin to expand at a temperature of about 80° C. to about 100° C.

6. The waterborne-based adhesive of claim 1, wherein the expandable microspheres have a maximum expansion temperature of about 120° C. to about 130° C.

7. The waterborne-based adhesive of claim 1, further comprising a crosslinker, defoamer, preservative, surfactant, rheology modifier, filler, pigment, dye, stabilizer, polyvinyl alcohol, humectant, and mixtures thereof.

8. The waterborne-based adhesive of claim 1, wherein the additive is selected from the group consisting of tackifiers, plasticizers, crosslinker, and mixtures thereof.

9. The waterborne-based adhesive of claim 8, wherein the crosslinker is selected from the group consisting of aluminum nitrate, zirconium acetate, ammonium zirconyl carbonate and mixtures thereof.

10. The waterborne-based adhesive composition of claim 1, wherein the adhesive further comprises an accelerator that is a multivalent water-soluble salt.

11. The waterborne-based adhesive composition of claim 10, wherein the multivalent water-soluble salt is selected from the group consisting of aluminum nitrate, zirconium acetate, ammonium zirconyl carbonate and mixtures thereof.

12. A process for forming an article comprising the steps of:
   (a) preparing a composition comprising:
      (1) a water-based polymer prepared by emulsion polymerization that has (i) an elastic modulus greater than 0.5 MPa in the range temperature range of 70° C. to 110° C.; (ii) an absolute log(E)/T slope of less than 0.05 in the range temperature range of 70° C. to 110° C.; and (iii) a tan d value less than 0.6 at 90° C.; and
      (2) a plurality of expandable microspheres;
   (b) applying the composition onto a substrate, which is a paper, paperboard or wood;
   (c) drying the composition to substantially remove the water; and
   (d) expanding the composition.

13. The process of claim 12, wherein steps (c) and (d) are simultaneously combined.

14. The process of claim 12, wherein the composition is applied in a pattern.

15. The process of claim 14, wherein the pattern is a series of dots, stripes, waves, checkerboards, or a polyhedron shape that have substantially a flat base.

16. An article comprising a cellulosic substrate and a composition comprising:
- (a) a water-based polymer prepared by emulsion polymerization that has (i) an elastic modulus greater than 0.5 MPa in the range temperature range of 70° C. to 110° C.; (ii) an absolute log(E)/T slope of less than 0.05 in the range temperature range of 70° C. to 110° C.; and (iii) a tan d value less than 0.6 at 90° C.; and
- (b) a plurality of expandable microspheres.

17. The article of claim 16, wherein the water-based polymer is selected from the group consisting of emulsion-based polymer selected from the group consisting of vinyl acetate ethylene dispersion, polyvinyl acetate, polyvinyl acetate polyvinyl alcohol, dextrin stabilized polyvinyl acetate, polyvinyl acetate copolymers, vinyl acetate-ethylene copolymers, vinylacrylic, styrene acrylic, acrylic, styrene butyl rubber, polyurethane and mixtures thereof.

18. The article of claim 17, wherein the cellulosic substrate is a fiberboard, corrugated board, solid bleached boards, kraft paper or coated paper.

19. The article of claim 16 is a multilayer substrate.

20. The multilayer substrate of claim 19 is a cup, food container, case, carton, bag, box, lids, envelope, wrap or clamshell.

* * * * *

UNITED STATES PATENT AND TRADEMARK OFFICE
CERTIFICATE OF CORRECTION

PATENT NO. : 9,849,655 B2
APPLICATION NO. : 15/158879
DATED : December 26, 2017
INVENTOR(S) : Tianjian Huang et al.

It is certified that error appears in the above-identified patent and that said Letters Patent is hereby corrected as shown below:

In the Specification

Column 9, Line 28: Change "gift" to -- g/ft --.

Signed and Sealed this
Twenty-fifth Day of December, 2018

Andrei Iancu
*Director of the United States Patent and Trademark Office*